(12) United States Patent
Joshi et al.

(10) Patent No.: US 7,509,327 B2
(45) Date of Patent: Mar. 24, 2009

(54) BUSINESS DATA MIGRATION USING METADATA

(75) Inventors: Nisheth P. Joshi, Redmond, WA (US); Patrick R. LeQuere, Redmond, WA (US); Parul Manek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 10/727,258

(22) Filed: Dec. 3, 2003

(65) Prior Publication Data

US 2005/0125463 A1 Jun. 9, 2005

(51) Int. Cl.
*G06F 17/30* (2006.01)
(52) U.S. Cl. .......................... 707/100; 707/6; 707/204; 707/101
(58) Field of Classification Search .................. 707/3, 707/10, 200–205, 102
See application file for complete search history.

(56) References Cited

U.S. PATENT DOCUMENTS

| | | | |
|---|---|---|---|
| 5,878,411 A * | 3/1999 | Burroughs et al. | 707/4 |
| 6,016,497 A * | 1/2000 | Suver | 707/103 R |
| 6,112,199 A * | 8/2000 | Nelson | 707/4 |
| 6,151,608 A * | 11/2000 | Abrams | 707/204 |
| 6,269,382 B1 * | 7/2001 | Cabrera et al. | 707/204 |
| 6,356,901 B1 * | 3/2002 | MacLeod et al. | 707/6 |
| 6,502,098 B2 * | 12/2002 | Lau | 707/102 |
| 6,574,631 B1 * | 6/2003 | Subramanian et al. | 707/101 |
| 6,732,095 B1 * | 5/2004 | Warshavsky et al. | 707/5 |
| 6,785,673 B1 * | 8/2004 | Fernandez et al. | 707/3 |
| 6,915,304 B2 * | 7/2005 | Krupa | 707/102 |
| 7,257,597 B1 * | 8/2007 | Pryce et al. | 707/102 |
| 2002/0065879 A1 * | 5/2002 | Ambrose et al. | 709/203 |
| 2002/0161778 A1 * | 10/2002 | Linstedt | 707/102 |
| 2003/0023608 A1 * | 1/2003 | Egilsson et al. | 707/100 |
| 2004/0123048 A1 * | 6/2004 | Mullins et al. | 711/141 |
| 2004/0143563 A1 * | 7/2004 | Saake et al. | 707/1 |

OTHER PUBLICATIONS

CDF Database Structure, http://msdn.microsoft.com/library/en-us/CrmSdk/htm/cdfstructure.asp?fram=true, p. 1, 2003.
Microsoft CRM Data Migration, http://msdn.microsoft.com/library/en-us/CrmSdk/htm/datamigration.asp?fram=true, p. 1, 2003.
Microsoft CRM SDK, http://msdn.microsoft.com/library/en-us/CrmSdk/htm/default.asp?fram=true, pp. 1-3, 2003.

(Continued)

*Primary Examiner*—Cam Y T Truong
(74) *Attorney, Agent, or Firm*—Christopher R. Christenson; Westman, Champlin & Kelly P.A.

(57) ABSTRACT

Metadata driven business data migration is provided. An extensible business data destination system is provided having metadata that describes its structure. An intermediate database is structurally synchronized to the extensible destination system prior to receiving source data. Once the structural synchronization between the destination system and the intermediate database has been completed, the intermediate database is populated with source data. Customizable migration overhead information is stored and used to allow highly configurable specification of data migration. Once migration information has been specified, and any required manipulations have been completed with respect to the source data in the intermediate database, a migration tool generates business data in the destination system to complete the migration.

14 Claims, 6 Drawing Sheets

OTHER PUBLICATIONS cdf_Account Table, http://msdn.microsoft.com/library/en-us/CrmSdk/htm/cdf_account.asp?fram=true, pp. 1-6, 2003.

Data That Can Be Migrated, http://msdn.microsoft.com/library/en-us/CrmSdk/htm/migratadata.asp?fram=true, p. 1, 2003.

Microsoft CRM Data Migration Framework, Sononma Partners, http://www.sonomapartners.com/articles/data-migration-framwork/aspx, pp. 1-2, 2003.

Bernstein, Philip A., "Panel: Is Generic Metadata Management Feasible?", Proceedings of the 26th International Conference on Very Large Databases, Cairo, Egypt, 2000.

Merant, "Migration Offerings for Merant Dimensions™ 8," 2003.

Hurwitzgroup, "The Data Fast Track to PeopleSoft's Success," Apr. 2002.

* cited by examiner

BUSINESS DATA MIGRATION USING METADATA

BACKGROUND OF THE INVENTION

Virtually every business today relies heavily upon computers. Such reliance includes the use of computers for human resources management; book keeping; shipping; inventory control; purchasing; sales and customer relationship management, to name but a few. Even businesses of modest size can generate very substantial amounts of data that must be tracked and/or managed using computers. These systems may be acquired individually over time or construed as a comprehensive integrated business solution that can address all of the businesses needs with a single integrated solution.

In general, it is extremely rare that a given piece of software will meet each and every criteria of the business in an as-shipped state. Accordingly, there is usually a significant amount of customization and/or coding that must be done to tailor software to an individual business' needs.

As a business grows and relies upon its computer system, the databases and other related files in the business software system can grow very large. Accordingly, when a business considers whether to upgrade its business software to a competing system, one significant concern is the cost of migrating data from the legacy system(s) to the new system. This can be an extremely daunting task because the legacy system may be comprised of any number of systems that may be incompatible with each other, or the upgrade system and which systems may be located in geographically diverse locations. Thus, simply getting all of the business data together in one place and working with it in order to provide it into the new system can require large amounts of time from extremely skilled software technicians and/or developers. Thus, one significant barrier of widespread adoption of new and improved business software systems is the pain of data migration.

Figure 2:
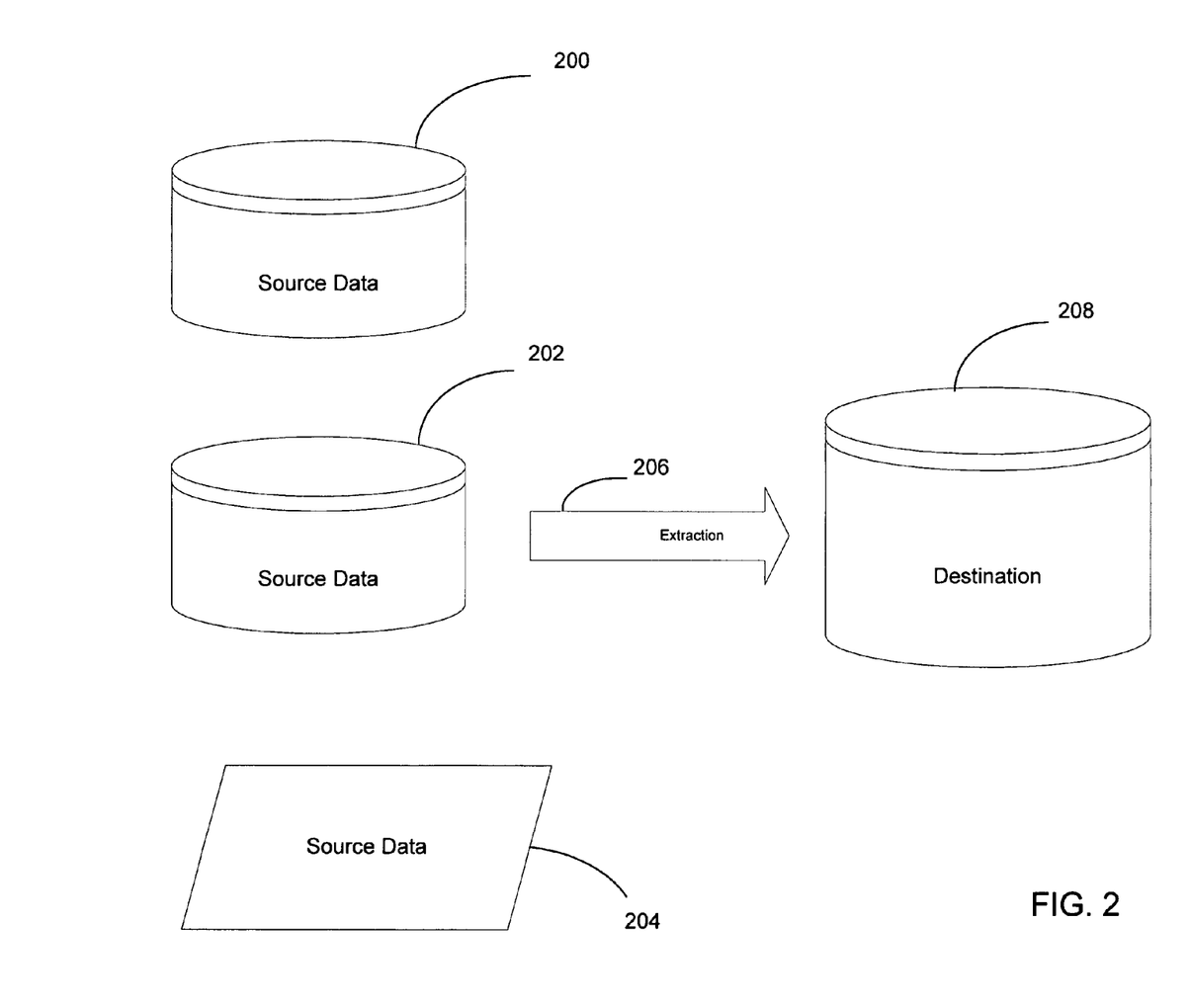
FIG. 2 is a diagrammatic view of data migration in accordance with the prior art.

Traditionally, migration tools used to move data from one business system to another used a set of hard-coded rules to create a business object in the destination system from a set of pre-defined fields in the source system. This prior art approach is illustrated in FIG. 2 that shows sources of legacy business data 200, 202, 204 providing an input to hard-coded data extraction tool 206 that provides the data to destination system 208. This traditional approach has two significant drawbacks. First, it does not enable the migration tool 206 to survive any changes in the layout of either the source or destination databases. Changes to the destination database schema may actually occur when future releases of the destination system ship, or when patches or upgrades are applied to the destination system to address any possible issues with the destination system. Secondly, the destination system may have an extensible architecture that enables users to customize business objects by defining their own set of properties. In the past, the hard-coded set of rules were not aware of any database customizations and accordingly, were unable to adapt the extraction behavior to carry over any custom fields.

SUMMARY OF THE INVENTION

Metadata driven business data migration is provided. An extensible business data destination system is provided having metadata that describes its structure. An intermediate database is structurally synchronized to the extensible destination system prior to receiving source data. Once the structural synchronization between the destination system and the intermediate database has been completed, the intermediate database is populated with source data. Customizable migration overhead information is stored and used to allow highly configurable specification of data migration. Once migration information has been specified, and any required manipulations have been completed with respect to the source data in the intermediate database, a migration tool generates business data in the destination system to complete the migration.

DETAILED DESCRIPTION OF THE PREFERRED EMBODIMENTS

Figure 1:
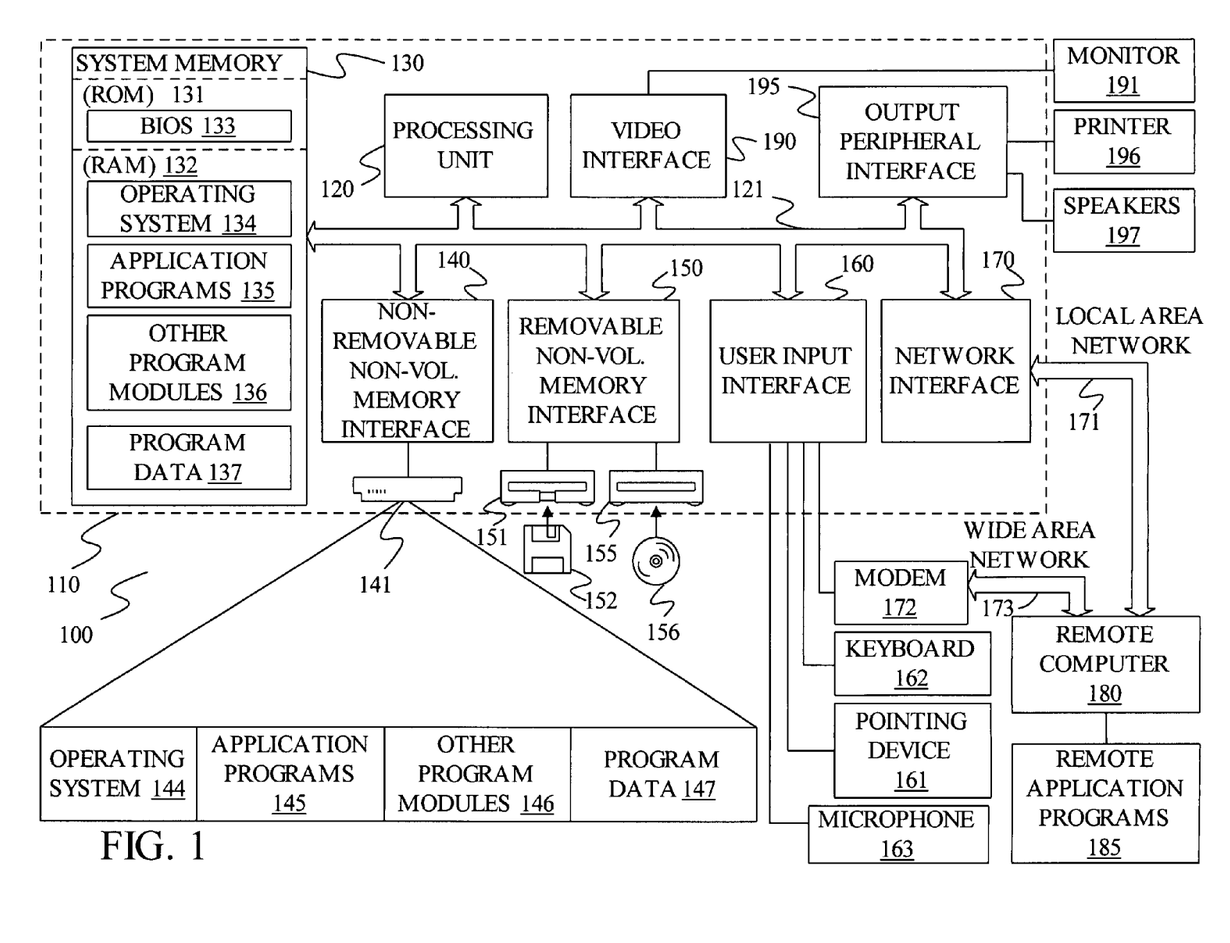
FIG. 1 is a diagrammatic view of a computing environment in which embodiments of the present invention are particularly useful.

FIG. 1 is a block diagram of an environment in which embodiments of the present invention may be practiced. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise communication media. Computer storage media includes both volatile and nonvolatile, storage media, removable and non-removable storage media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic disk storage or other magnetic storage devices, or any other storage medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic storage media, a magnetic disk drive 151 that reads from or writes to a removable, nonvolatile magnetic disk 152, and an optical disk drive 155 that reads from or writes to a removable, nonvolatile optical disk 156 such as a CD ROM or other optical storage media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 3:
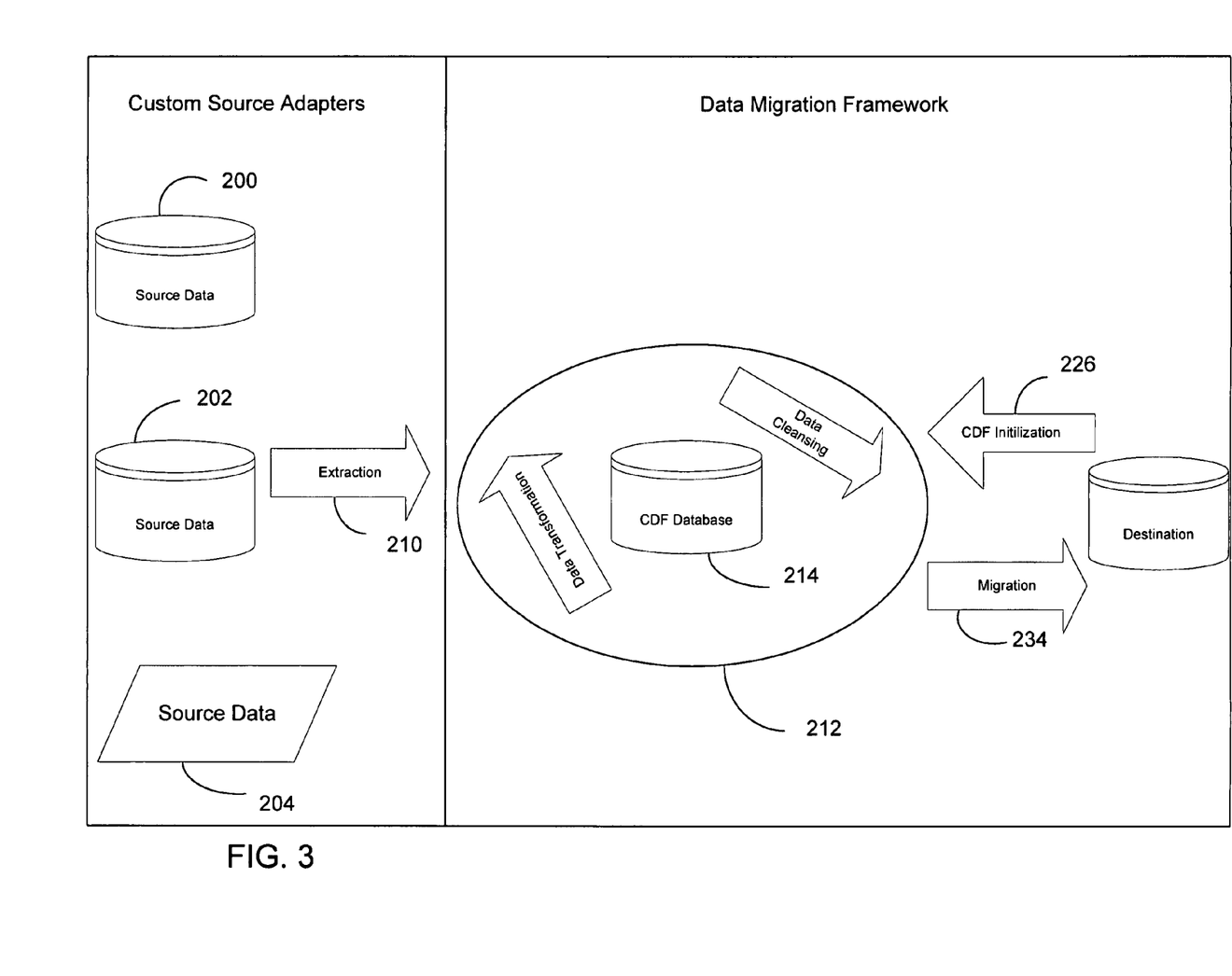
FIG. 3 is diagrammatic view of data migration in accordance with an embodiment of the present invention.

FIG. 3 is a diagrammatic view of data migration in accordance with an embodiment of the present invention. As illustrated in FIG. 3, some of the very initial steps of data migration (specifically data extraction from numerous sources) are similar to the prior art methods described with respect to FIG. 2. Accordingly, data is still extracted from one or more sources 200, 202, 204. However, instead of requiring that the extraction process not only assemble all of the data, but process all of the manipulations required to port the data to the destination system, extraction process 210 provides data to intermediate system 212. Intermediate system 212 includes an intermediate database that can be embodied on commercially available database servers. For example, database 214 can be a Common Data Format (cdf) database embodied on database server software sold on the trade designation Microsoft SQL server 2000 available from Microsoft Corporation of Redmond, Wash. Within or related to database 214, are generally at least two types of tables used in the cdf database. Among these are entity tables which contain the data from the source system, and cdf metadata tables which are pre-populated, as part of the cdf database setup, in accordance with an embodiment of the present invention. For each entity that can be migrated to the destination system, the cdf database will include two or three entity tables: one entity table (cdf_<entity>) is for customer data that is to be entered in standard (i.e. existing before any customization) fields in the destination system. Another entity table, (cdf_<entity>_info) is for migration information. Yet a third table (cdf_<entity>_ext) is for data that is to be migrated to custom fields in the extensible destination system.

Cdf metadata tables, in accordance with an embodiment of the present invention, are pre-populated as part of the cdf database setup and are generally not used to store customer data. The metadata tables contain definition criteria for the migration process, such as the size of test batches (numbers of entities or data to be migrated as a test) and whether an entity or attribute should be migrated. The cdf migration tool, preferably a program operating in accordance with an embodiment of the present invention, uses these tables to control the migration process. The database can also include stored procedures for cleansing data and controlling the data migration process.

Figure 4:
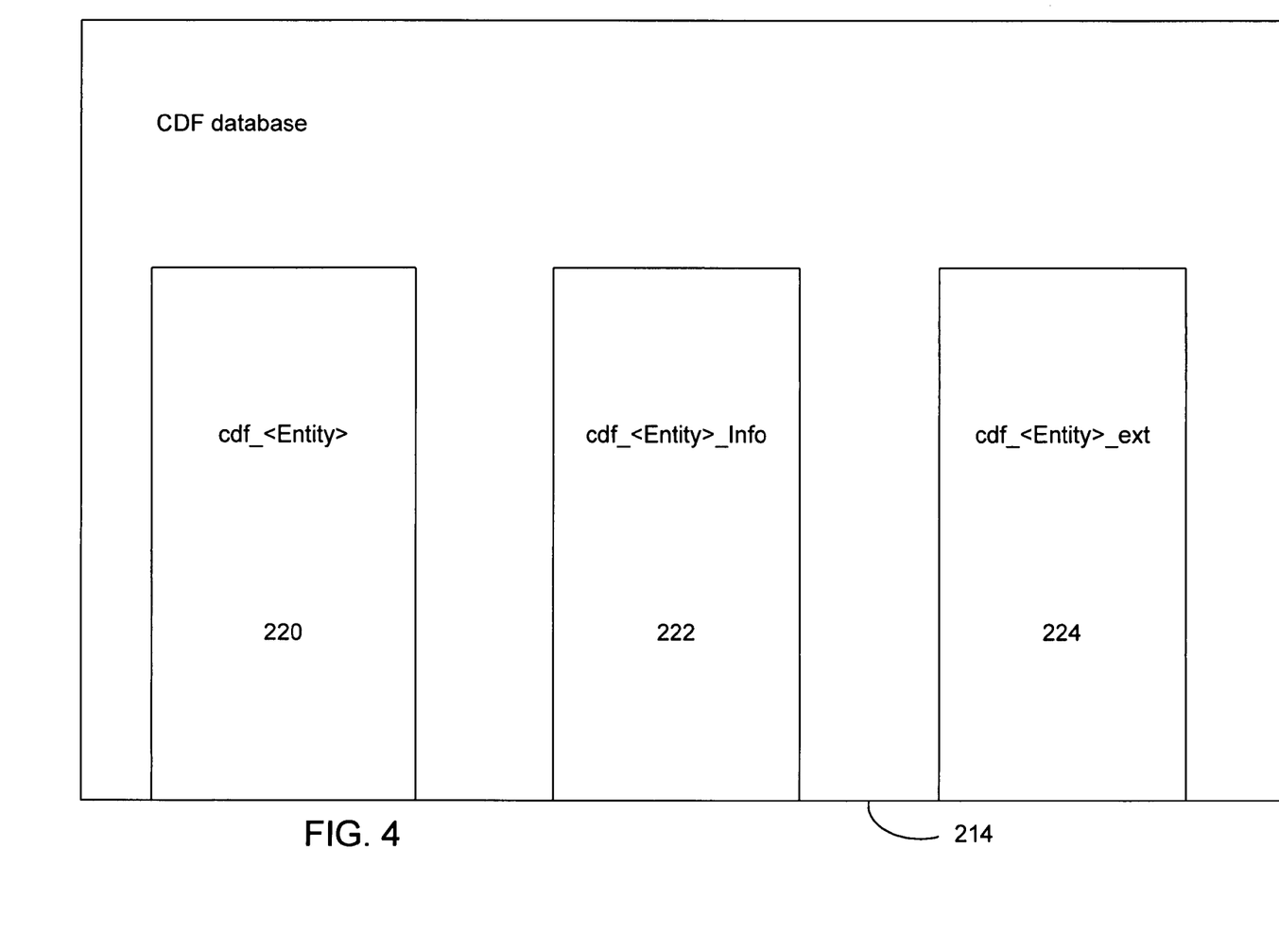
FIG. 4 is a diagrammatic view of a cdf database in accordance with an embodiment of the present invention.

FIG. 4 is a diagrammatic view of cdf database 214 in accordance with an embodiment of the present invention. Preferably, cdf database 214 includes three entity tables. Specifically, database 214 includes cdf_<entity> table 220, cdf_<entity>_info table 222, and cdf_<entity>_ext table 224.

Entity base table 220 is designed to store customer data for migration. <Entity> can be any suitable entity that is predefined in the destination system. Examples of <entity> include Account, Activity, ActivityParty, Annotation, Competitor, Contact, CustomerAddress, Discount, DiscountType, Incident, Invoice, InvoiceDetail, Lead, Opportunity, OporutnityProduct, PriceLevel, Product, ProductPriceLevel, Quote, QuoteDetail, SalesOrder, SalesOrderDetail, Subject, UoM, and UoMSchedule.

As described briefly above, the entity base table 220 is used to store data for the entity that is being migrated. Each record in the entity base table has a field for each attribute that can be migrated to the associated destination system entity. This includes all optional destination system attributes, that, by default, are not on the standard destination system forms for the entity. In order to facilitate data cleansing to meet destination system requirements, the entity base table generally includes a string attribute as well as an integer attribute for storing data for identifier and dropdown list attributes. The integer attribute stores the data that is to be migrated; the string stores the string associated with the integer. All <entity>Id attributes are integers and each has an associated <entity>IdName string attribute. All <drop-down list>Code attributes are integers, and each has an associated <drop-down list> CodeName string attribute. Each attribute in each entity base table has an associated record in the cdf_entity attribute table which will be described in more detail with respect to FIG. 5. Only those attributes listed in the cdf_EntityAttribute metadata are migrated, which means that additional columns in the entity base tables can be created for tracking information about data cleansing and for removing duplicative data.

Entity information table 222 is designed to contain migration information for the entities that will be migrated to the destination system. There is one record in entity information table 222 for each record in the associated entity base table. When a record is inserted or deleted in an entity base table, a software trigger automatically adds the associated record to or deletes the associated record from the entity information table to keep the data synchronized between the two tables. Entity information table 222 can be loaded with the source name, source entity name, and source identifier both as a string and as an integer if tracking between the data source and the data destination is desired. The source strings are not migrated, but they provide the ability to trace each record from the destination system back to the source system. Additionally, the migration tool will generally add a destination GUID from the destination system in the DestinationId attribute in an entity information table 222 when the record has been migrated successfully. The GUID data is useful for tracking which records have been migrated successfully since if a record does not have a GUID, it was not migrated. The following listing provides attributes in the cdf_<entity>_info tables. cdf_<entity>_Info attribute—description of attribute.

<entity>Id—primary key for the table.

SourceSystemName—name of the source system (for example ACT!, GoldMine). The migration tools do not use this attribute, but it can be used as a reference in case it is necessary to look up where data came from in the source system.

SourceEntityName—name of the table in the source system where the data originates. It can be used to distinguish entities coming from different source systems, or different databases of the same source systems (for example, contact_1). The migration tables do not use this attribute either, but it can be used as a reference if it is necessary to look up where data came from in the source system.

SourceIdStr—identifier of the source object in the form of a string, for example, AdvWks-3 for a source database that uses a combination of characters and numbers in the identifier attribute. The migration tools do not use this attribute either, but it can be used as a reference case if it is necessary to look up where the data came from in the source system.

SourceIdInt—identifier of source object in the form of an integer (for example, 3). The migration tools do not use this attribute, but it can be used as a reference if it is necessary to look up where data came from in the source system.

DestinationSystemName—name of the destination. This is the name of the destination system, for example, Microsoft CRM.

DestinationEntityName—name of the destination entity to which this data is migrated. This attribute value is the name of the entity represented in the entity information table (for example, in the cdf_accountinfo table, this attribute value is 'account').

DestinationId—the destination system GUID. The migration tool populates this attribute after the record has been migrated. This can be used to track which records have been successfully migrated.

StatusCode—indicates the success or failure codes during the migration of this object.

Entity extension table 224 exists only for this destination system entities that are customizable. When a record is inserted or deleted in an entity base table, a trigger automatically adds the associated record to or deletes the associated record from the entity extension table to keep the data synchronized between the two tables. The primary key for a cdf_<entity>_ext table is <entity>Id, which is the same as the primary key for the cdf_<entity> table. If the destination system schema has been extended in some manner, then running the data migration initialization tool 226 (see FIG. 3) will ensure that for each new attribute that has been created in the destination system for a customizable entity, there will now be an associated attribute in the entity extension table for that entity. Custom data can now be loaded into the custom attributes for each record in the entity extension table 224.

For example, if a new date/time attribute called StartDate has been added to the destination system 'contact' form and the change has been published, there will now be an attribute in the cdf_contact_ext table called StartDate. Additionally, there would be one record in the cdf_contact_ext for each record in the cdf_contact table. For each contact, the start date would be loaded into the record cdf_contact_ext and the rest of the contact data would be loaded into the record cdf_contact.

In order to facilitate cleansing the data so that it may meet the requirements of the destination system, the entity extension table 224 will generally include a string attribute as well as an integer attribute for storing data from drop-down list attributes. The integer attribute stores the data that is to be migrated; the string attribute stores the string associated with the integer. All <drop-down list> attributes are integers and each has an associated <drop-down list>Name string attribute for example, if a drop-down list is added to the destination system, two new attributes, SpecializedCategory and SpecializedCategoryName, are added in entity extension table 224. The string attribute is then populated when the cdf database is populated with data; the integer attribute is populated when the process of cleansing the drop-down list data is complete.

Each attribute in table 224 has an associated record in cdf_EntityAttribute table. Only attributes listed in the cdf_EntityAttribute table (described in greater detail with respect to FIG. 5) are migrated. This means that additional columns in the entity extension tables can be created for tracking information about cleansing data and removing duplicities. Having the extension table 224 separate from the entity base table provides enough space to store custom field data and any data cleansing information that may be required.

Figure 5:
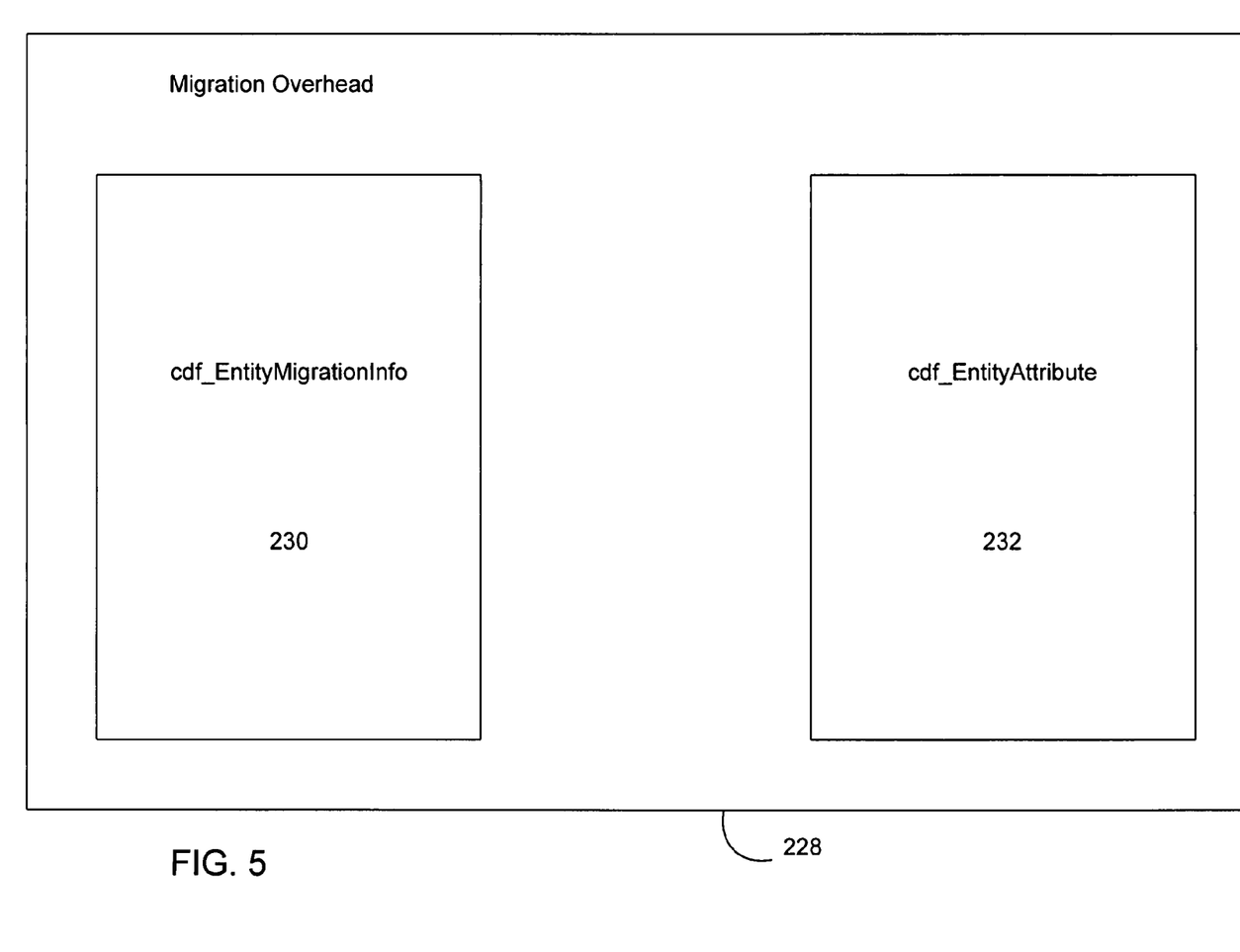
FIG. 5 is a diagrammatic view of migration overhead in accordance with an embodiment of the present invention.

FIG. 5 is a diagrammatic view of migration overhead information 228 in accordance with an embodiment of the present invention. Migration overhead information 228 can be part of cdf database 214, or may be separate therefrom. Migration overhead information 228 includes cdf_EntityMigrationInfo table 230 and cdf_EntityAttribute table 232.

cdf_EntityMigrationInfo table 230 specifies information about the migration process for each of the entities. The following list provides the attributes in the cdf_EntityMigrationinfo table:

cdf_EntityMigrationInfo table attribute description of attribute.
entityId the primary key for the entity.
EntityName the name of the entity.
ObjectTypeCode the number that the destination system uses for this entity.
IsCustomizable indicates whether this entity is customizable in the destination database.
SourceCount specifies the number of records that exist in the cdf database 214 for the entity. After the process of extraction and cleansing is complete and then data from each data source is consolidated into the cdf database an internal procedure can be run for each entity to count the number of records available for the entity for migration and that count will be stored in this attribute.
TestBatchCount used to test migrations to set how many records from the entity are to be imported into the destination system when the migration tool is executed. To set the value for this field, an internal procedure is preferably used. For example, if the number 100 is specified in this field, then only the first 100 entities of this type will be migrated into the destination system.
MigrationCode specifies whether or not this entity should be migrated. By default, all entities will preferably have a code indicating that they will be migrated. The data for this code is also preferably changed using internal procedures within the migration system.
MigrationOrder specifies the order in which the entities should be migrated to preserve dependencies. Migration will follow the order specified in this attribute.

cdf_EntityAttribute table 232 stores the name, label, type, and size of each attribute and the associated entity of the attribute. Table 232 also specifies whether the attribute is used to define relationships between entities, whether it is a drop-down list (pick list), whether it is a custom attribute in the destination system, whether it should be migrated and its migration status. Preferably, values within this table are not changed directly, but instead are changed by internal procedures provided as a part of the migration framework to modify values therein. The use of stored procedures helps insure that interaction with the crucial migration overhead data 228 is effected in a pre-defined manner set by the design of the internal procedures. The following list provides attributes in cdf_EntityAttribute table 232:

cdf_EntityAttribute table attribute description of attribute.
EntityId—the identifier for the entity with which this attribute is associated. The identifier is based on the unique EntityId value for the entity from the cdf_EntityMigrationInfo table 230. This field serves as the primary key for the table along with AttributeName.
AttributeName—the name of the attribute.
AttributeLabel—the label of the attribute.
AttributeType—the type of the attribute.
AttributeSize—the size of the attribute. The size is determined by the size of the attribute in the destination system.
SourceAttributeName name of the attribute in the source database.
IsRelationship indicates whether this attribute is a relationship.
IsPickList indicates whether this attribute is a drop-down list (picklist).
IsCustom indicates whether this is a custom attribute in the destination system.
ValidForCreate provides data required for the migration tool.
ValidForUpdate provides additional data for the migration tool.
IsCorrelation indicates that this attribute is used by the migration tool to correlate data.
MigrationCode specifies whether this attribute should be migrated. By default, all attributes other than the primary key for each table will preferably have a migration code of 1, which means that they will be migrated. If a specific attribute is not to be migrated, an internal procedure is preferably used to set this value to 0 indicating that the attribute will not be migrated.

The following is a description of a pair of internal procedures useable with the migration system described above. The first procedure, p_dm_ExtendSchema is a procedure that extends the cdf database by creating a new column using the specified type and size in the appropriate cdf_<entity>_ext table and adding the specified field to the cdf_EntityAttribute table. This procedure preferably has the following form:

Create Proc p_dm_ExtendSchema
@ EntityName nvarchar(50),
@ SourceAttribName nvarchar (100),
@ SourceAttribLabel nvarchar (100),
@ SourceAttribSize int,
@ ValidForCreate nvarchar (10),
@ ValidForUpdate nvarchar (10).

The above-procedure is preferably used with the following syntax: exec p_dm_ExtendSchema 'contact', 'pager', 'pager', 'nvarchar', '12.'

Another procedure is used to read the cdf_EntityAttribute table 232 and determine which attributes describe the specified entity and return a list of attributes to query. This procedure, p_dm_GetFields, is preferably used in the following manner: exec p_dm_GetFields 'account', 'a', @ ReturnList. The definitions portion of this procedure is listed below:

create procedure p_dm_GetFields
@ EntityName varchar (100),
@ TableAlias varchar (10),
@ ReturnList varchar (2000) output.

When the p_dm_GetFields procedure is run and the return list is provided, the migration tool will then pick primary values from the appropriate cdf_<entity>table, extended values from the cdf_<entity>_ext table, and pass them to the destination system.

Embodiments of the present invention also utilize two important modules for migration: InitializeCDF tool 226 and CDF import tool 234.

Figure 6:
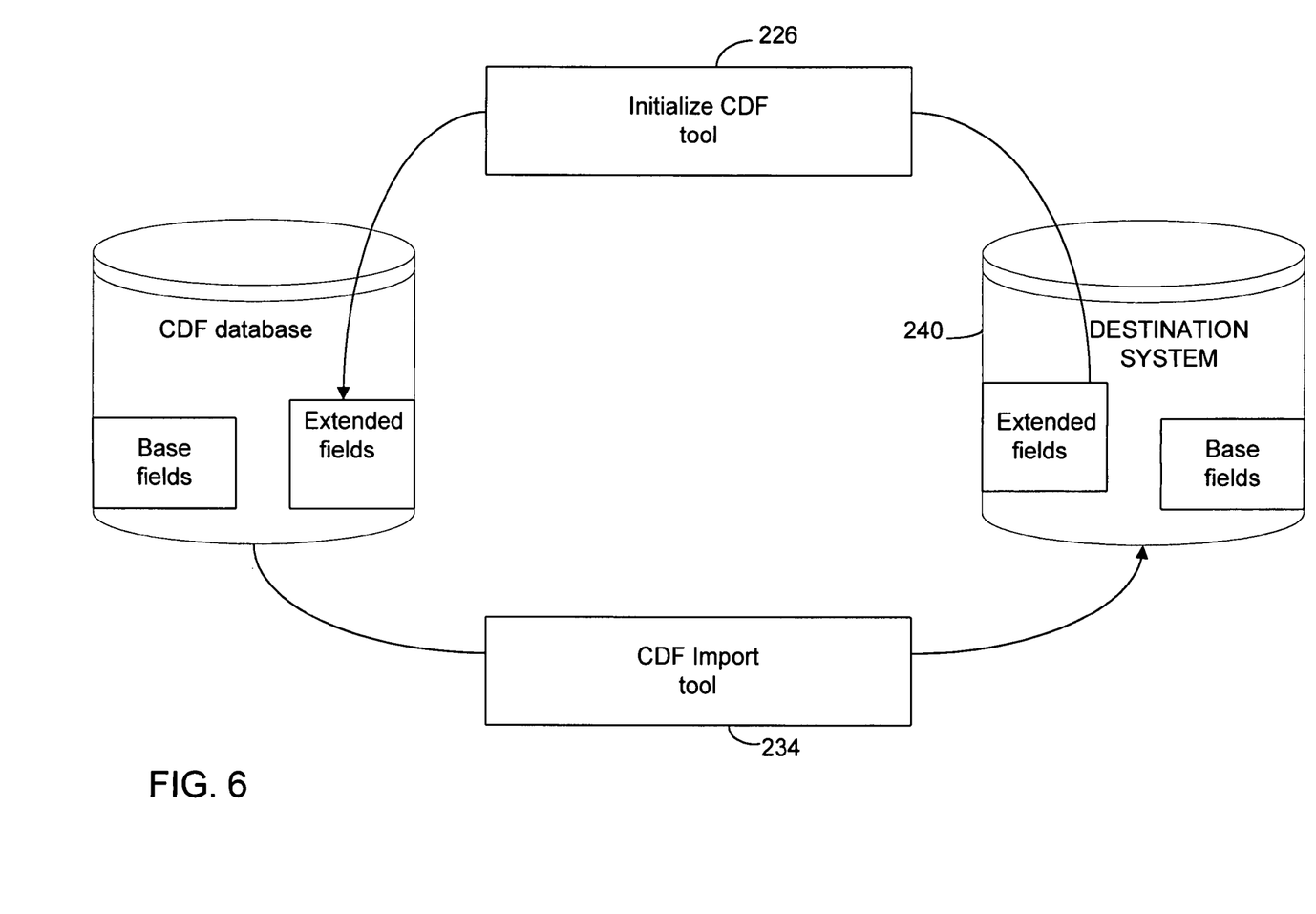
FIG. 6 is a diagrammatic view of business data migration in accordance with an embodiment of the present invention.

FIG. 6 is a diagrammatic view of data migration in accordance with an embodiment of the present invention. InitializeCDF tool 226 may be run at any time and operates to synchronize the structure of cdf database 214 with the latest changes to the destination system. Once InitializeCDF tool 226 has run, cdf database 214 will have the proper structure to receive the source data in a manner that will require significantly less manipulation before providing the data to the destination system. Once the requisite data manipulations and cleansing have been completed, cdf import tool 234 operates to finalize the migration of data from cdf database 214 to the destination system. As set forth above with respect to FIG. 5, migration information is highly customizable with respect to which entities will be migrated, which attributes will be migrated, the number of entities and/or attributes that can be migrated, and even the order of migration.

Although the present invention has been described with reference to preferred embodiments, workers skilled in the art will recognize that changes may be made in form and detail without departing from the spirit and scope of the invention.

What is claimed is:

1. A method of migrating business data from a source system to an extensible destination system, the method comprising:
   at a computer, examining a structural definition of the extensible destination system, wherein the examining the structural definition of the extensible destination system includes accessing metadata related to the extensible destination system;
   synchronizing a structure of an intermediate database system with the extensible destination system, wherein the intermediate database system includes an entity extension table and an entity base table, the entity extension table and the entity base table are stored in a computer readable storage medium, wherein the synchronizing is performed prior to receiving source data, wherein the entity extension table is populated based upon an extension in the extensible destination system, the entity extension table exists only for destination extensible system entities that are customizable;
   collecting the source data from the source system and populating the synchronized structure of intermediate database system with the source data;
   specifying whether an attribute is used to define relationships between entities, whether the attribute should be migrated and migration status of the attribute;
   setting how many records from the entities are to be imported into the destination system when a migration tool is executed;
   specifying order in which the entities are migrated to preserve dependencies;
   migrating the source data from the intermediate database system to the extensible destination system according to migration overhead information, the migrating follows the order specified in the attribute, wherein the migration overhead information includes user-configurable, and an EntityMigrationInfo table and wherein the EntityMigrationInfo table specifies information about migration for each entity to be migrated.

2. The method of claim 1, wherein synchronizing the structure of the intermediate database system with the extensible destination system includes invoking an initialization tool.

3. The method of claim 1, wherein the user-configuration is limited to using one or more predefined software procedures.

4. The method of claim 1, wherein migration overhead information includes information about which entities are to be migrated.

5. The method of claim 1, wherein migration overhead information includes information about how many entities will be migrated.

6. The method of claim 1, wherein migration overhead information includes information about which attributes will be migrated.

7. The method of claim 1, wherein the migration overhead information includes an EntityAttribute table.

8. The method of claim 1, wherein the migration overhead information is stored as part of an intermediate database.

9. The method of claim 1, wherein an intermediate database is embodied on a Structured Query Language (SQL) server.

10. A computer readable storage medium having stored instructions for migrating business data from a source system to an extensible destination system, wherein the instructions are executed by a computer for performing steps:
    examining a structural definition of the extensible destination system, wherein the examining the structural definition of the extensible destination system includes accessing metadata related to the extensible destination system;
    synchronizing a structure of an intermediate database system with the extensible destination system, wherein the intermediate database system includes an entity extension table and an entity base table, the entity extension table and the entity base table are stored in a memory, wherein the synchronizing is performed prior to receiving source data, wherein the entity extension table is populated based upon an extension in the extensible destination system, the entity extension table exists only for destination extensible system entities that are customizable;

collecting the source data from the source system and populating the synchronized structure of intermediate database system with the source data;

specifying whether an attribute is used to define relationships between entities, whether the attribute should be migrated and migration status of the attribute;

setting how many records from the entities are to be imported into the destination system when a migration tool is executed;

specifying order in which the entities are migrated to preserve dependencies;

migrating the source data from the intermediate database system to the extensible destination system according to migration overhead information, the migrating follows the order specified in the attribute, wherein the migration overhead information includes user-configurable, and an EntityMigrationInfo table and wherein the EntityMigrationInfo table specifies information about migration for each entity to be migrated.

11. The computer readable storage medium of claim 10, wherein user-configuration is limited to using one or more predefined software procedures.

12. The computer readable storage medium of claim 10, wherein migration overhead information includes information about how many entities will be migrated.

13. The computer readable storage medium of claim 10, wherein the migration overhead information includes an EntityAttribute table.

14. The computer readable storage medium of claim 10, wherein the migration overhead information is stored as part of an intermediate database.

* * * * *